Figure 1:
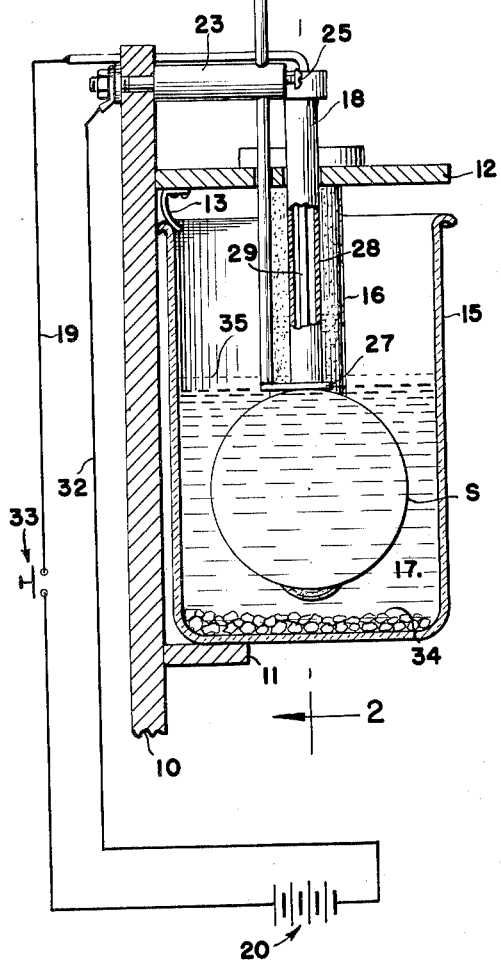

Aug. 30, 1955 — D. P. ROBERTSON — 2,716,596

DETERMINATION OF TIN ON TINPLATE

Filed Jan. 18, 1952

INVENTOR
DELBERT P. ROBERTSON
BY
ATTORNEY

2,716,596

DETERMINATION OF TIN ON TINPLATE

Delbert P. Robertson, Weirton, W. Va., assignor to National Steel Corporation, a corporation of Delaware Application January 18, 1952, Serial No. 267,118

8 Claims. (Cl. 23—230)

The present invention relates to determining the amount of tin present on the ferrous metal base of tinplate.

The weight of tin present on tinplate is customarily referred to as a certain weight of tin per base box. A base box of tinplate contains 217.78 square feet of tinplate and as tinplate is coated on both surfaces with tin, the amount of tin per base box is distributed over a total area of 435.56 square feet. Thus, the expression "¾ pound tinplate" refers to tinplate having ¾ of a pound of tin per base box with this quantity of tin being distributed over an area of 435.56 square feet.

Large quantities of tinplate are produced by manufacturers for the canning industry and other industries. The amount of tin on the tinplate varies widely depending upon the method used in producing the tinplate and also depending upon the ultimate use of the tinplate. Electrolytic tinplate usually has a relatively thinner coating of tin than hot dipped tinplate with the electrolytic tinplate having from about ¼ to 1¼ pounds of tin per base box. Electrolytic tinplate having about ¾ of a pound of tin per base box is widely used in large quantities, particularly in the can making industry. The fabricator of tin plate requires tinplate having a certain weight of tin and this weight depends upon the ultimate use of the tinplate. The price charged by the manufacturer depends upon the amount of tin per base box. Thus, frequent determinations of the amount of tin present on tinplate must be made by both the manufacturer and the user or fabricator. This is particularly true with the electrolytic tinplate which is now produced in very large quantities. In view of the fact that a large number of samples must be tested, the method for testing samples to determine the amount of tin present must be rapid. Accurate determinations are especially important when testing electrolytic tinplate as a relatively slight deviation from the nominal weight may well render the tinplate unsafe for its intended use by the purchaser and may change the price of the tinplate. A satisfactory method for determining tin coating weight should be accurate within 0.005 pound per base box. Accordingly, a satisfactory test must be accurate in addition to being rapid. Further, the method of testing tinplate should be one that can be made in a routine manner by those not highly skilled in chemistry. The conditions under which tinplate is tested in manufacturing and fabricating plants often are not closely controlled and a satisfactory method is one that can be performed under varying conditions, particularly temperature conditions.

Many methods have been suggested heretofore for determining the amount of tin on a sample of tinplate. While a number of these prior art methods are satisfactory for tests performed in laboratories by highly trained personnel under conditions which are carefully controlled and where time is not essential, they are not satisfactory for present day commercial usage where a large number of determinations must be made quickly and accurately in the plant of the manufacturer or fabricator by semi-skilled personnel under varying conditions.

One of the earlier and well known methods of testing tinplate samples which is not satisfactory for present day commercial requirements is the "Sellars" method. This method is described in "Standard Methods of Chemical Analysis," W. W. Scott, 4th edition, 1925, pages 533, 534 and 535. In carrying out the Sellars method a sample of tinplate having a known area is completely dissolved in an aqueous solution of hydrochloric acid containing excess acid, that is, more acid than is required to dissolve the sample. Thereafter, carbon dioxide is passed through the solution. After the solution has been cooled, the solution is titrated with a standard iodine solution, such as a standard iodine-potassium iodide solution. Starch is used as the indicator and the reaction involved is

$$SnCl_2 + I_2 + 2HCl = SnCl_4 + 2HI$$

Thus by knowing the amount of iodine required to convert the stannous tin to the stannic tin, both the amount of tin present on the sample and the amount of tin per base box can be readily calculated. It requires a long time to dissolve the entire sample and complete the determination and it is not practical for use in a plant commercially producing or using tinplate in large quantities where many samples must be tested in a short period of time. While the Sellars method has been considered fairly accurate, this method does indicate that there is more tin on the sample than is actually present in the coating. The black plate which is customarily used as the base for tinplate contains tin and as the entire sample is dissolved in the Sellars method, the resulting tin determination shows both the amount of tin on the tinplate and the amount of tin in the base metal. Insofar as is known, the Sellars method is only used in the tinplate industry for carrying out determinations in the laboratories by skilled personnel where time is not essential. This method is not used in plants where a large number of determinations must be quickly and accurately made.

A more recent and faster method of determining the coating weight of tin on tinplate is the Buser method described in Buser patent, No. 2,206,026. In this method the sample having a known area is suspended in an aqueous hydrochloric acid solution by means of a clip. The hydrochloric acid solution contains a known quantity of standard iodate solution. The iodate solution contains a known quantity of potassium iodate and an excess of potassium iodide. In the acid solution which contains an excess of hydrochloric acid, iodine is liberated according to the reaction,

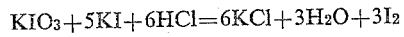

$$KIO_3 + 5KI + 6HCl = 6KCl + 3H_2O + 3I_2$$

It is essential in the Buser process that this iodine be present. A cathode is immersed in the solution and the cathode is connected to a source of electric current while the sample supporting clip is connected as an anode to the opposite side of the source of electric current. The electric current is passed through the solution and the sample to electrolytically strip the tin from the tinplate. The iodine in the stripping solution converts the tin from the stannous to the stannic form. After the tin has been electrolytically removed, the solution is titrated with a standard solution of sodium thiosulfate to react with the excess iodine in the solution according to the reaction, $2Na_2S_2O_3 + I_2 = 2NaI + Na_2S_4O_6$. The amount of iodine required to effect conversion of the tin in the solution from the stannous to the stannic form can be readily determined by subtracting the amount of iodine titrated with the sodium thiosulfate from the amount of iodine present in the solution. While this method is quite rapid, there are several factors which contribute to erroneous results. One of the errors is a negative error resulting from the incomplete solution of tin from beneath the clip which Buser uses to support and connect the sample to the source of electric current. Another error is a positive error resulting from the reduction of iodine by the hydrogen generated at the cathode.

In order to overcome the above mentioned errors of the Buser method, a more recent method was developed by Gordon H. Bendix and this method is described in his patent, No. 2,455,726 and also is described in an article entitled "Determination of tin coating weight" by G. H. Bendix, W. C. Stammer and A. H. Carl, appearing in "Industrial and Engineering Chemistry," vol. 15, page 501, August 15, 1943. In the Bendix method, the sample is suspended by means of a magnet to eliminate the clip of Buser and the cathode is surrounded by a porous container to prevent the hydrogen formed in the catholyte in the porous container from passing into the anolyte. It is essential in this method that iodine be present in the anolyte. The Bendix method is quite rapid and has been considered to be accurate. The method has been widely accepted throughout the industry and insofar as is known, the Bendix method is used by substantially all, if not all, of the manufacturers and users of tinplate to determine the amount of tin present on tinplate where a large number of determinations must be made quickly.

While the Bendix method has been widely accepted throughout the tinplate industry as a standard, I have discovered that volatilization of iodine occurs and that the Bendix method is not reliable and that workers in the tinplate industry have been misled as to the accuracy of this method. This discovery was made as a result of the fact that I have found that at times and for some heretofore unexplained and unsuspected reason, inconsistent results were obtained. The volatilization of the iodine results in a positive error. While this error varies with the temperature and time required to make the determination, it results in the determination showing the presence of more tin than is actually present on the tinplate. I also have discovered that this positive error has been masked in part, and at times in its entirety, by a negative error resulting from the air oxidation of the stannous tin present in the stripping solution. For ¾ pound tinplate which is produced in large quantities and which is popular in the can industry, the positive and negative errors tend to balance each other when the test is carried out at a room temperature of about 78° F. Thus, the correct result has been obtained accidentally in the past, particularly when the determination was carried out under a temperature condition which was thought to have little, if any, effect on the results.

In accordance with the present invention and as a result of my discoveries, the tin is electrolytically stripped from the sample in an aqueous hydrochloric acid solution and the amount of tin is determined by titration, all under conditions which eliminate the volatilization of iodine and which eliminate the oxidation of tin. Carrying out the determination under conditions which eliminate the volatilization of iodine, eliminates the positive error and permits the temperature, the concentration of iodine and time required to make a determination to be varied without adversely affecting the results. Preventing the air oxidation of stannous tin, eliminates the masking negative error in the Bendix method.

When determining the amount of tin present on tinplate in accordance with the present invention, the tin on the sample is electrolytically removed while the sample is exposed to an aqueous hydrochloric acid solution. Oxidation is prevented by maintaining the stripping solution free of contact with oxygen, which includes both dissolved oxygen and oxygen in air above the surface of the stripping solution. Volatilization of iodine is prevented by titrating the stripping solution with iodine after the tin has been dissolved so that iodine is not present in the stripping solution as is essential in the Buser and Bendix methods. The present method is rapid and is more accurate than prior methods. In addition, the present method can be carried out by relatively unskilled workers under widely varying conditions and it is not necessary to control the temperature and stripping period as is necessary in the Bendix method.

Figure 2:
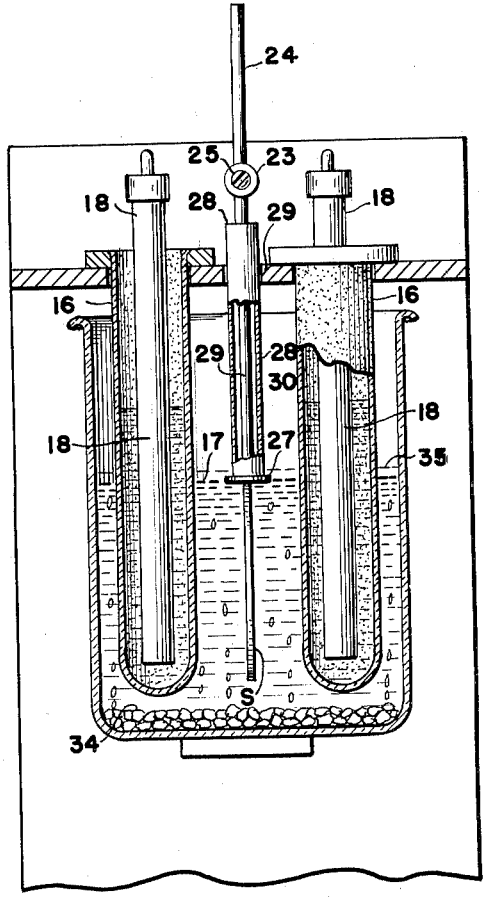

Referring to the drawings, which illustrate a preferred form of apparatus for stripping tin from a sample when making a tin determination in accordance with the present method:

Figure 1 is a transverse sectional view of an electrolytic cell for electrolytically stripping tin from a sample, and Figure 2 is a front sectional view taken along line 2—2 of Figure 1.

Stand 10 includes a lower shelf 11 and an upper shelf 12. Beneath shelf 12 there is a clip 13 with the clip 13 and shelf 11 being spaced apart so that a container 15, such as a 300 milliliter tall form glass beaker, can be placed in position on the stand by inserting the lip of the beaker beneath the clip 13 and then moving the beaker inwardly so that it rests on shelf 11.

The shelf 12 contains suitable openings in which are supported two porous cups 16, each having a length so as to extend down into the body of aqueous hydrochloric acid solution 17 in container 15. In each porous cup 16 there is mounted a cathode 18 and each cathode 18 is connected through a wire 19 to one side of a source of electric current, for example, battery 20.

On stand 10, there is a clamp 23 in which there is mounted a vertical rod 24. The clamp 23 includes a screw 25 and by loosening the screw 25, the rod 24 can be vertically adjusted to the desired position and then fastened in this position by tightening the screw 25. The rod 24 which is preferably formed of nickel or other suitable metal that will not be attacked by the acid solution in the beaker 15 has fastened to the bottom end a shelf or foot 27. The foot 27 supports a sealed glass tube 28 which extends from the foot 27 upwardly through an opening 29 in shelf 12. Thus, the glass tube 28 is maintained in the vertical position. The sealed tube 28 which may be glass or other suitable material contains a permanent magnet 29 which holds the sample S against the foot 27. Thus, the entire area of both surfaces of the sample S is exposed to the bath of aqueous hydrochloric acid solution 17 and all of the tin can be completely removed. The rod 24 is connected through clamp 23 and wire 32 to the opposite side of the source of electric current 20. The rod 24 and sample S are connected as an anode, while the rods 18 and the solution 17 are connected as cathodes to the source of electric current. A switch 33 is interposed in the electric circuit for the cell and preferably the switch is normally open and is closed only when it is desired to strip the tin from the sample S.

The cups 16 are porous and divide the stripping bath 17 into anolyte surrounding the anode or sample S and catholyte surrounding the cathode 18. The porous cups 16 permit the passage of liquid between the two bodies of liquid but inhibit the passage of tin ions from the anolyte into the catholyte and thereby inhibit the plating of tin onto the cathodes 18 which would produce erratic and inaccurate results. While the porous cups 16 inhibit the plating of tin onto the cathode, they do not prevent such plating. Preferably and prior to stripping the sample, additional bath solution is poured into the cups 16 to raise the level of the catholyte above the level of the anolyte. While the catholyte does seep through the cups, this will be sufficiently slow to maintain the level of the catholyte above that of the anolyte during stripping of the sample.

Before operating the electrolytic cell to test the sample

S, a quantity of various solutions or reagents are prepared. Where a large number of samples are to be tested, then relatively large quantities of reagents may be prepared. The strength of some of these reagents may be varied depending upon the quantity of tin present on the sample. Where the samples will contain widely varying quantities of tin, then a corresponding number of batches of reagents of varying strength may be prepared.

An aqueous hydrochloric acid stripping solution may be prepared, by diluting chemically pure hydrochloric acid with water so that the resulting aqueous solution contains 1 part hydrochloric acid to 7 parts of water. Other ratios may be used although this ratio of 1 to 7 is satisfactory. It is necessary that there by more hydrochloric acid present in the solution than is required to react with the tin to form stannous chloride and to react subsequently with the iodate-iodide solution, if such a solution is subsequently used to titrate the tin. The quantity of acid present in the stripping bath is a function of bath quantity and acid concentration.

A standard potassium iodate solution may be prepared for example by dissolving 31.1773 grams of potassium iodate, 130 grams of potassium iodide and .5 gram of sodium hydroxide in 18 liters of distilled water. This makes a 0.048091 normal solution. The alkali, sodium hydroxide prevents hydrolysis. This solution must be made up quite accurately as to the weight of potassium iodate which as previously pointed out, liberates iodine in the presence of hydrochloric acid. Alternatively, the standard iodate solution may be standardized and may, for example, be standardized against sample containing a known weight of tin.

Other iodine solutions of different iodine concentration may be used which contain free iodine or which liberate iodine, either before or after being added to the stannous tin solution. For example, a standard iodine solution may be used that comprises iodine in an excess of potassium iodide.

A suitable indicator starch solution may be prepared by making a paste of 1 gram of soluble starch, in about 5 milliliters of water and then adding this paste to about 100 milliliters of boiling water, the solution is cooled and can then be used as desired. If desirable, a preservative may be added to the starch solution so as to avoid preparing a fresh solution each day.

The following procedure describes a preferred procedure and the present method is not limited to this procedure except as may be clearly indicated. In carrying out the present process about 200 millititers of 1 to 7 hydrochloric acid solution is placed in a 300 milliliter beaker 15, the sample of tinplate, which may for example, contain 4 square inches per side is suspended by means of the magnet 30 from the support or foot 27 and the beaker is placed in position on shelf 11, so as to completely immerse the sample S in the body of solution 17. Preferably about 7 grams of marble chips are placed in the beaker shown at 34 before it is placed on the shelf and the marble chips through their reaction with the hydrochloric acid, slowly generate carbon dioxide which bubbles up through the solution and forms a blanket 35 of carbon dioxide directly above the upper surface of the body of solution 17. Other forms of calcium carbonate may be used. Additional hydrochloric acid stripping solution is poured into cups 16 to raise the level of the catholyte above the anolyte. The cups may be completely filled. The switch 33 is closed and a current of, for example, 2 amperes at a potential of 7.5 volts is allowed to flow until all of the tin is in the solution. This may require about from 1 to 5 minutes, depending upon the coating weight of tin on the sample. During this time catholyte which is substantially free of dissolved tin flows into the anolyte to prevent the plating of tin onto the cathode 18 by preventing the migration of ions of dissolved tin from the anolyte through the porous cups into the catholyte. The time is not critical and the period only needs to be long enough so that all of the tin is removed from the sample. As will be pointed out, continuing the flow of current after the tin has been removed does not seriously affect the results, although the entire sample should not be dissolved or the tin present in the base metal will form part of the tin titrated.

While the tin is being electrolytically stripped the carbon dioxide generated in the bottom of the bath 17 by reaction of the marble chips with the hydrochloric acid maintains the solution out of contact with oxygen. The beaker 15 is considerably larger than the stripping bath and extends above the bath to block stray air currents so that a layer of carbon dioxide is maintained above the bath as a protective blanket between the bath and the atmosphere. If the carbon dioxide was not bubbled up through the solution, then the stannous tin would be oxidized to the stannic form by the oxygen of the atmospheric air in contact with upper surface of the solution. The bubbling carbon dioxide also sweeps out any oxygen dissolved in the bath that would oxidize the tin. Accordingly, the bath 17 is maintained entirely out of contact with uncombined oxygen which includes both oxygen above the bath and oxygen in the bath, while electrolytically stripping the tin from the sample.

After all of the tin has been removed from the sample, the beaker is removed from the shelf 11 and a small amount of starch indicator is added to the bath 17. Then the solution is titrated with the standard potassium iodate solution to a blue end point. As the amount of iodine required to react with the tin is known, the amount of tin present on the sample can be readily calculated. With the 0.048091 normal iodate solution and a sample of 4 square inches, each milliliter of iodate solution equals 0.05 pound of tin per base box. Thus, multiplying the number of milliliters of iodate solution by 0.05 gives the weight of tin per base box.

The present method, unlike the Buser or Bendix methods, is not affected by the temperature changes customarily encountered in plants where tin determinations are made, does not include positive and negative errors which tend to mask each other and produce misleading results, and is not time sensitive so that the electrolytic stripping must be accurately controlled.

In the following discussion concerning the results obtained by the present method and the Bendix method, the tin determinations were carefully checked by a relatively complicated laboratory method. The Bendix method was carried out as described in detail in the Bendix patent and the present method was performed as hereinbefore described.

*Experiment A*

A number of comparative tests were made on ¾ pound tinplate which actually had 0.725 pound of tin per base box. These tests were made at 78° F. which is the temperature under which such tests are usually conducted in laboratories where the temperature is controlled. The average weight of tin in pounds per base box was 0.724 pound according to the Bendix method and 0.725 pound according to the present method. I have discovered these results are in agreement because the negative and positive errors balance each other for three quarter pound tin plate.

*Experiment B*

Samples of nominally half pound and one pound tinplate were tested with the following results:

| Nominal Weight | Actual Weight | Bendix Method | Present Method |
|---|---|---|---|
| | | 78° F. | 78° F. |
| 0.50 | 0.520 | 0.505 | 0.519 |
| 1.00 | 0.927 | 0.931 | 0.928 |

The lower result obtained on the half pound tinplate by the Bendix method results from the fact that the negative error is greater than the positive error. The positive error is somewhat greater than the negative error when testing one pound tinplate.

*Experiment C*

A number of samples were tested in which the Bendix method was modified to eliminate the negative error by freeing the electrolyte of oxygen. This was done by placing a few marble chips in the bath and the resulting carbon dioxide bubbles removed the oxygen. The stripping time under the Bendix method was 2 minutes.

| Actual Weight | Bendix Method | Present Method |
|---|---|---|
| 0.725 | 78° F.<br>0.735<br>0.734<br>0.734<br>0.733 | 78° F.<br>0.725<br>0.725<br>0.725<br>0.725 |

The Bendix method indicates, on the average, 0.009 pound per base box higher because the negative error had been eliminated.

*Experiment D*

A series of samples having 0.725 pound of tin per base box were tested as described under Experiment C, except the temperature was changed to 95° F.

| Present Method | Bendix Method |
|---|---|
| 95° F.<br>0.725<br>0.725<br>0.725<br>0.725 | 95° F.<br>0.745<br>0.741<br>0.741<br>0.741 |

Increasing the temperature to 95° F. does not affect the present method but does increase the positive error in the Bendix method by about 0.008 pound per base box as is shown by comparing Experiments C and D.

*Experiment E*

A series of comparative tests were made in which the stripping time was varied. The time is expressed as the number of minutes during which electric current was passed through the samples.

| Time | Present Method | Time | Bendix Method |
|---|---|---|---|
| 2 | 0.725 | 2 | 0.727 |
| 3 | 0.725 | 3 | 0.732 |
| 4 | 0.725 | 4 | 0.741 |
| 6 | 0.725 | 5 | 0.755 |
| 8 | 0.724 | 6 | 0.766 |
| 10 | 0.722 | | |

In the Bendix method the test must be accurately timed or the results are high. As the time is increased, volatilization of the iodine is increased which increases the positive error. In the present method, the time need not be accurately controlled and may, for example, be as long as ten minutes. Preferably, the stripping period is not prolonged unduly so as to avoid dissolving substantial amounts of the base metal.

In describing the present method, the stripping is effected while maintaining the stripping bath out of contact with oxygen, both dissolved oxygen and atmospheric oxygen adjacent the upper surface of the bath. Preferably, this is done by bubbling carbon dioxide formed in situ or from an external source or another inert gas, for example, nitrogen, through the bath but this may be done by other means. The bath may be freed of dissolved oxygen prior to placing the sample in the cell and during the stripping of the sample the bath may be maintained out of contact with air by a blanket of inert gas above the bath or by other means.

The present method has a number of very important advantages in addition to being rapid and accurate. In the plant operating on a commercial basis, samples must be tested rapidly by relatively non-skilled workers. Such workers will not control the temperature and the temperature will be that temperature existing in the plant. The plant temperature will and does vary widely. In addition, it is difficult, if not impossible, to have such workers consistently and accurately time the tests. With the present method, such workers obtain accurate results as the method is not sensitive to time or temperature variations.

An advantage in the use of marble chips resides in the fact that some carbon dioxide is generated after the sample has been stripped and this additional carbon dioxide protects the solution from oxidation while the solution is standing before titration. Normally, the solution is titrated fairly quickly and oxidation is not a particularly serious problem. If the solution must stand before being titrated, the container may be covered or protected in any suitable manner, particularly when carbon dioxide is not present.

While the present application has been described more particularly in connection with tinplate, its principles are applicable to plate having thereon a plurality of coatings, such as coatings of nickel and tin. Further, the principle of flowing catholyte into anolyte may be used when anodically dissolving metal other than tin from a sample, which metal tends to deposit on the cathode while current is flowing through the cell. The sample may be composed of a single metal or alloy or may be composed of plating metal on a base of different metal.

I claim:

1. The method of determining the amount of tin on a sample of tinplate having a ferrous metal base comprising the steps of arranging the sample as an anode in a bath of an electrolytic cell, the reactive constituent of the bath consisting essentially of aqueous hydrochloric acid, passing an electric current through the sample and the bath thereby electrolytically converting the tin to stannous ions, simultaneously bubbling an inert gas through the bath thereby preventing oxidation of stannous ions, and thereafter titrating the stannous chloride-containing bath solution with iodine to determine the amount of tin on the sample.

2. The method of determining the amount of tin on a sample of tinplate as claimed in claim 1 wherein the inert gas is carbon dioxide.

3. The method of determining the amount of tin on a sample of tinplate having a ferrous metal base comprising the steps of arranging the sample as an anode in a bath of an electrolytic cell, the reactive constituent of the bath consisting essentially of aqueous hydrochloric acid, passing an electric current through the sample and the bath while the bath is free of iodine, thereby electrolytically converting the tin to stannous ions, simultaneously bubbling an inert gas through the bath thereby preventing oxidation of stannous ions, and thereafter titrating the stannous chloride-containing bath solution with iodine to determine the amount of tin on the sample.

4. The method of determining the amount of tin on a sample of tinplate having a ferrous metal base comprising the steps of arranging the sample as an anode in a bath of an electrolytic cell, the cell bath containing pieces of calcium carbonate and the reactive constituent of the cell bath consisting essentially of aqueous hydrochloric acid, passing an electric current through the sample and the bath thereby electrolytically converting the tin to stannous ions, the calcium carbonate reacting with hydrochloric acid in the bath to form carbon dioxide and thereby maintaining the bath free of oxygen to prevent oxidation of stannous ions, and thereafter titrating the stannous chloride-containing bath solution with iodine to determine the amount of tin on the sample.

5. The method of determining the amount of tin on a sample of tinplate having a ferrous metal base comprising the steps of arranging the sample as an anode in a bath of an electrolytic cell, the cell bath containing pieces of calcium carbonate and the reactive constituent of the cell bath consisting essentially of aqueous hydrochloric acid, passing an electric current through the sample and the bath while the cell bath is free of iodine thereby electrolytically converting the tin to stannous ions, the calcium carbonate reacting with hydrochloric acid in the bath to form carbon dioxide and thereby maintaining the bath free of oxygen to prevent oxidation of stannous ions, and thereafter titrating the stannous chloride-containing bath solution with iodine to determine the amount of tin on the sample.

6. The method of determining the amount of tin on a sample of tinplate having a ferrous metal base comprising the steps of arranging the sample as an anode in an anolyte portion of a bath of an electrolytic cell including a cathode arranged in a catholyte portion of the bath and a porous wall separating the anolyte and catholyte portions of the bath, the reactive constituent of the bath consisting essentially of aqueous hydrochloric acid, passing an electric current through the sample and the bath thereby electrolytically converting the tin to stannous ions, maintaining the anolyte free of oxygen while passing current thereby preventing oxidation of stannous ions, simultaneously maintaining the level of the catholyte above the level of the anolyte and thereby flowing catholyte through the porous wall into the anolyte to prevent the deposition of tin onto the cathode, and thereafter titrating the stannous chloride-containing bath solution with iodine to determine the amount of tin on the sample.

7. The method of determining the amount of tin on a sample of tinplate having a ferrous metal base comprising the steps of arranging the sample as an anode in an anolyte portion of a bath of an electrolytic cell including a cathode arranged in a catholyte portion of the bath and a porous wall separating the anolyte and catholyte portions of the bath, the reactive constituent of the cell bath consisting essentially of aqueous hydrochloric acid, passing an electric current through the sample and the bath thereby electrolytically converting the tin of the sample to stannous ions, simultaneously maintaining the level of the catholyte above the level of the anolyte and thereby flowing catholyte through the porous wall into the anolyte to prevent the deposition of tin onto the cathode, simultaneously bubbling an inert gas through the anolyte thereby preventing oxidation of the stannous ions, and thereafter titrating the stannous chloride-containing bath solution with iodine to determine the amount of tin on the sample.

8. The method of determining the amount of tin on a sample of tinplate as claimed in claim 7 in which the inert gas is carbon dioxide.

References Cited in the file of this patent

FOREIGN PATENTS 679,931    Germany _____ Aug. 18, 1939

OTHER REFERENCES

"Analytical Chemistry," by Treadwell and Hall, 9th edition (1937), vol 2, page 631 and 632; Sci. Lib.

"Industrial and Engineering Chemistry," Analytical Edition, vol. 15, (1943), pages 501 through 504 of article by Bendix et al.